United States Patent
Lee

(10) Patent No.: US 7,428,739 B2
(45) Date of Patent: Sep. 23, 2008

(54) DISC RELEASE APPARATUS FOR DISC PLAYER

(75) Inventor: Hwan-seung Lee, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 337 days.

(21) Appl. No.: 11/177,315

(22) Filed: Jul. 11, 2005

(65) Prior Publication Data
US 2006/0048166 A1  Mar. 2, 2006

(30) Foreign Application Priority Data
Aug. 10, 2004  (KR)  ........................ 10-2004-0062740

(51) Int. Cl.
*G11B 17/04* (2006.01)
(52) U.S. Cl. .................................... 720/619
(58) Field of Classification Search .............. 720/600, 720/617, 619–626, 636–639, 645
See application file for complete search history.

(56) References Cited

U.S. PATENT DOCUMENTS

2003/0235131 A1* 12/2003 Kim et al. .................. 369/77.1
2006/0143626 A1* 6/2006 Hu ............................. 720/619

FOREIGN PATENT DOCUMENTS

| JP | 2000113546 A | * | 4/2000 |
| KR | 06-044660 | | 2/1994 |
| KR | 11-259942 | | 9/1999 |
| KR | 1020030070434 | | 8/2003 |

OTHER PUBLICATIONS

Machine translation of JP 2000113546 A.*
Official translation of JP 2000-113546.*

* cited by examiner

*Primary Examiner*—Joseph Feild
*Assistant Examiner*—Nathan Danielsen
(74) *Attorney, Agent, or Firm*—Staas & Halsey LLP

(57) ABSTRACT

A disc release apparatus for a disc player. The disc release apparatus includes: a slide plate installed on a main chassis, so that the slider plate is moved in a direction transverse to a transfer direction of a disc by being linked with the slider; and a linkage unit installed on the main chassis, so that the linkage unit can move the disc in the transfer direction of the disc by being linked with the slide plate. With this arrangement, the number of components of the disc release apparatus can be reduced, and thus the disc player can be miniaturized.

12 Claims, 6 Drawing Sheets

DISC RELEASE APPARATUS FOR DISC PLAYER

CROSS-REFERENCE TO RELATED APPLICATION

This application claims the benefit under 35 U.S.C. § 119 (a) of Korean Patent Application No. 2004-62740 filed Aug. 10, 2004 in the Korean Intellectual Property Office, the disclosure of which is incorporated herein by reference.

BACKGROUND OF THE INVENTION

1. Field of the Invention

The present invention relates to a disk player, and in particular to a slot-in loading type disc player which has no tray. More particularly, the present invention relates to a disc release apparatus for a disc player, in which the disc release apparatus serves to separate a guide member from a disc transferred to a chucking position by the guide member.

2. Description of Related Art

In general, a disc drive records information on or reproduces information from a disc such as a compact disc (CD), a CD-ROM, a digital video disc (DVD), a DVD-ROM or the like and has a loading apparatus for loading a disc into a position for recording information on or reproducing information from the disc. A disc introduced into a disc player is loaded on a turntable and then clamped by a chucking unit, thereby being rotatable. Then, while the disc is rotating on the turntable, an optical pickup records information on or reproduces information from the disc while moving in the radial direction of the disc.

In order for a disc to be introduced into a disc player so that the optical pickup can record information on or reproduce information from the disc in the above-mentioned manner, it is necessary to position the disc so that it is rotatable on the turntable. Therefore, after the disc has arrived at the chucking position, it is necessary to separate the guide member for guiding the disc to the chucking position from the disc by a predetermined distance.

However, such a conventional disc release apparatus has a problem in that because various components in the disc release apparatus should be linked with each other so as to separate the guide member from a disc, the power loss is very high when separating the guide member from the disc and a malfunction may be caused. In addition, because such a disc release apparatus is very complicated in construction and has a great number of components, it disturbs the miniaturization of a disc player employing such a disc release apparatus.

BRIEF SUMMARY

An aspect of the present invention provides a disc release apparatus for a disc player, wherein the disc release apparatus is improved in construction such that the number of components of the disc release apparatus can be reduced and malfunctions can be reduced.

According to an embodiment of the present invention, there is provided a disc release apparatus for a disc player including a disc guide lever linked with a slider sliding on a main chassis of the disc player to be contacted with or separated from a disc as the disc is loaded or unloaded, including: a slide plate installed on the main chassis and linked with the slider to be movable in a direction transverse to a transfer direction of the disc; and a linkage unit on the main chassis and linked with the slide plate to move the disc in the transfer direction.

The slide plate may include a flat sheet-like body having a cam slot, wherein the cam slot is shaped to be linked with and cam-followed by a cam pin provided on the slider.

The slide plate may include a guide slot so that the moving direction of the slide plate is controlled by a guide pin provided on the main chassis.

Furthermore, the linkage unit may include a cam pin provided on the slide plate, and one or more cam slots formed in the disc guide lever, so that the cam slots are linked with the cam pin to move the disc guide lever in the disc transfer direction.

The cam slots may include a first cam slot and a second cam slot, the cam pin being selectively inserted into one of the cam slots depending on the size of the disc as being loaded.

The inventive disc release apparatus may also include a locking unit linked with the slide late to lock or unlock the disc guide lever.

The locking unit may include a ridge formed in the slide plate, one or more position control recesses formed in the disc guide lever, and a locking lever rotatably installed on the main chassis and having a locking projection at one end thereof, wherein the locking projection comes into contact with the ridge, and a position control projection at the other end, wherein the position control projection is selectively engaged with the position control recesses.

The disc guide lever may include a first cam slot and a second cam slot, the cam pin being selectively inserted into one of the cam slots depending on the size of the disc as being loaded.

The locking lever may be elastically biased in one direction by an elastic member.

According to another embodiment, there is provided a disc release apparatus, including: a disc guide lever on a main chassis, linearly movable, and guiding transfer of discs to a chucking position within the main chassis; a slider mounted on a side of the main chassis and reciprocating in a disc transfer direction; a slide plate movably installed on the main chassis and linked with the slider and movable in a direction transverse to the disc transfer direction; and a linkage installed on the main chassis and linked with the slide plate so as to move the disc guide lever in the disc transfer direction or in a reverse direction.

According to another embodiment, there is provided a disc drive, including: a disc guide lever on a main chassis, linearly movable, and guiding transfer of discs to a chucking position within the main chassis; a slider mounted on a side of the main chassis and reciprocating in a disc transfer direction; a slide plate movably installed on the main chassis and linked with the slider and movable in a direction transverse to the disc transfer direction; and a linkage installed on the main chassis and linked with the slide plate so as to move the disc guide lever in the disc transfer direction or in a reverse direction.

Additional and/or other aspects and advantages of the present invention will be set forth in part in the description which follows and, in part, will be obvious from the description, or may be learned by practice of the invention

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
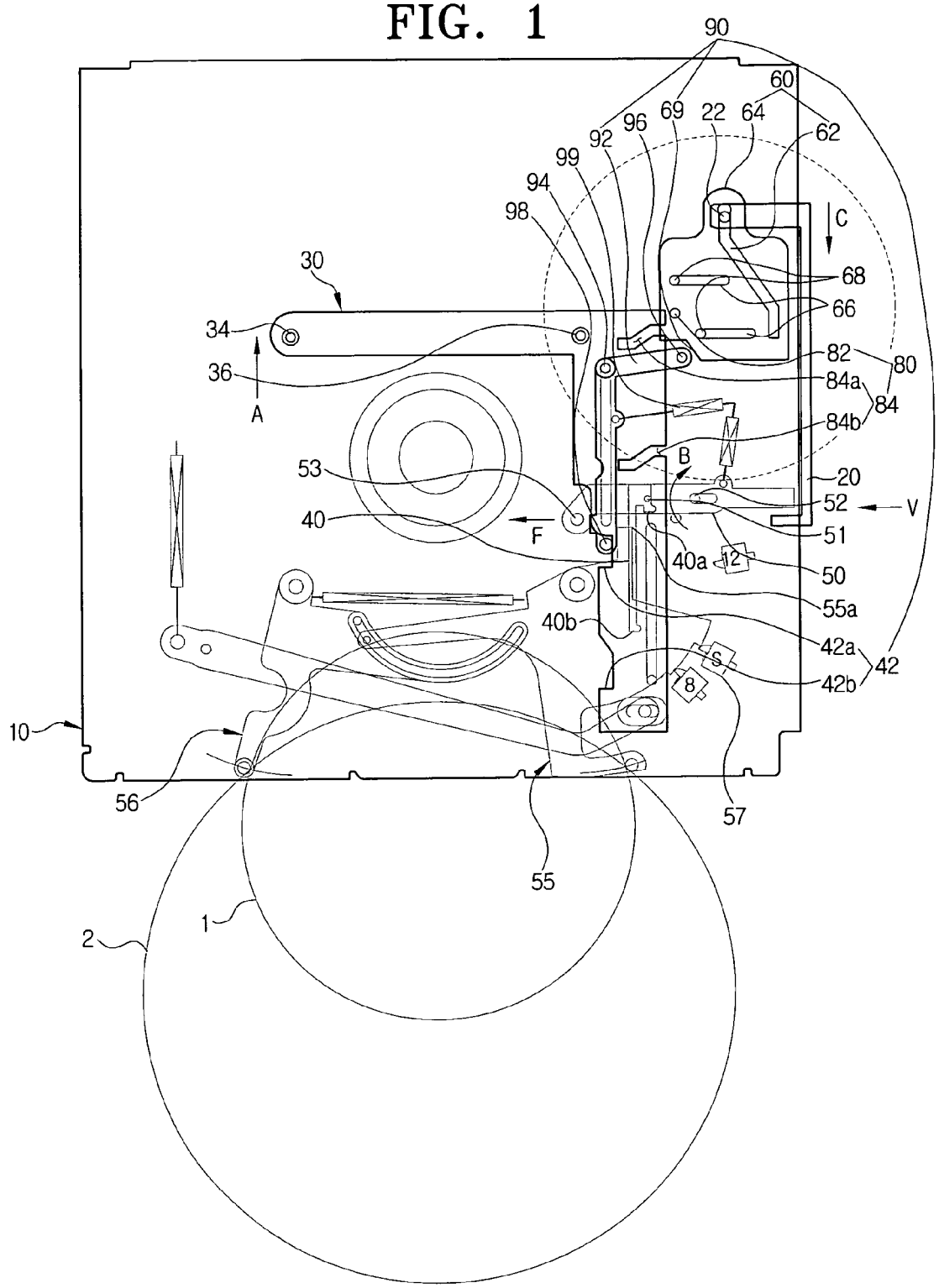
FIG. 1 is a top plan view schematically showing a disc release apparatus for a disc player.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
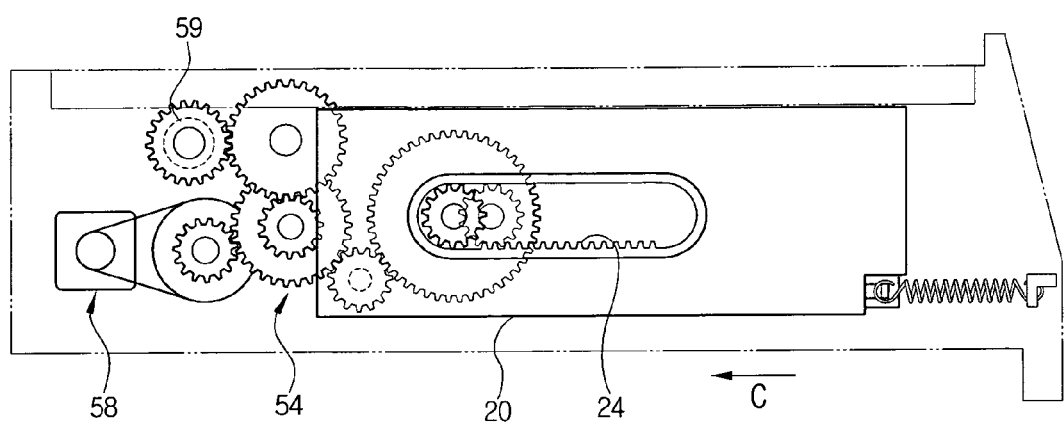
FIG. 2 is a side elevational view showing a main part extracted from and viewed in the direction of arrow "V" in FIG. 1.

Referring to FIGS. 1 and 2, a disc release apparatus includes a disc guide lever 30, a slider 20, a slide plate 60, a linkage unit 80 and a locking unit 90.

The disc guide lever 30 is installed on a main chassis 10 to be linearly movable back and forth, guides the transfer of any of discs 1 or 2 of different sizes to a chucking position within the main chassis 10, and has two disc guide projections 34, 36, which come into selective contact with the disc 1 or 2.

The present embodiment is hereinafter described with reference to an 80 mm disc (hereinafter, to be referred as "first disc") and a 120 mm disc (hereinafter, to be referred as "second disc") as the examples for the discs of different sizes.

The slider 20 is mounted on a side of the main chassis 10, to be reciprocated in the disc transfer direction. The slider 20 is formed with a rack gear 24, which is selectively connected to a power transmission unit 54, which is in turn connected to a driving motor 58. In order to connect the rack gear 24 with the power transmission unit 54, a pushing lever 50 is rotatably installed on the main chassis 10.

The slide plate 60 is movably installed on the main chassis 10 and linked with the slider 20 to move in a direction transverse to, and possibly perpendicular to, the disc transfer direction. The slide plate 60 has a flat sheet-like body 64 and a sliding cam slot 62.

The body 64 is formed in a flat sheet-like shape and installed at a side of the main chassis 10 to be movable left and right. The body 64 is provided with two guide slots 66. The guide slots 66 are engaged with two guide pins 68 provided on the main chassis 10, so that the guide slots 66 move along the guide pins 68, whereby the slide plate 60 is restrained so that it is allowed to only perform left and right linear movements on the main chassis 10.

The sliding cam slot 62 is formed in a so-called "crank shape" in the body 64. A sliding cam pin 22 provided on the rear part of the slider 20 and moving with the slider 20 is inserted into the sliding cam slot 62. With this arrangement, the sliding cam slot 62 is pushed by the sliding cam pin 22 left and right, while the sliding cam pin 22 moves along the sliding cam slot 62 when the slider 20 reciprocates in the disc transfer direction. By this, the body 64 is moved left and right, that is in the direction perpendicular to the disc transfer direction.

The linkage unit 80 is installed on the main chassis 10 and linked with the slide plate 60 to move the disc guide lever 30 in the disc transfer direction or the reverse direction. That is, by moving the disc guide lever 30, the disc guide projections 34, 36 provided on the disc guide lever 30 are separated from the disc 1 or 2. Such a linkage unit 80 has a cam pin 82 and one or more cam slots 84.

The cam pin 82 is provided at the left side of the body 64 of the slide plate 60 and selectively inserted into one of the cam slots 84.

The cam slots 84 are formed in the disc guide lever 30 so that one of the cam slots 84 is linked with the cam pin 82 to move the disc guide lever 30. That is, the cam slots 84 is pushed back and forth by the cam pin 82 at the time when the body 64 is moved left and right. By this, the disc guide projections 34, 36 are moved back and forth, so that the disc guide projections 34, 36 can be separated from or come into contact with the disc 1 or 2. The cam slots 84 include a first cam slot 84a and a second cam slot 84b. The first cam slot part 84a is the part into which the cam pin 82 is inserted when the disc guide lever 30 is separated from the first disc 1 and the second cam slot part 84b is the part into which the cam pin 82 is inserted when the guide disc lever 30 is separated from the second disc 2. The respective first and second cam slots 84a, 84b are formed in the disc guide lever 30 to be spaced from each other by a predetermined distance because the distance, over which the disc guide lever 30 is pushed and moved, is different from depending on the size of the disc 1 or 2. The number of such cam slots 84 can be changed depending on the types of discs of different sizes to be used in the disc player.

That is, in a disc player, in which only one disc is capable of being played, only one cam slot is provided, whereas in a disc player, in which three types of different discs are capable of being played, three cam slots 84 can be provided.

The locking unit 90 is installed on the main chassis 10 and moved in association with the slide plate 60 to selectively lock the disc guide lever 30. In detail, when the disc 1 or 2 is transferred, the locking unit 90 serves to lock the disc guide lever 30 so that the disc guide lever 30 can be prevented from being moved beyond the chucking position. However, such a locking unit 90 releases the disc guide lever 30 from the locking state when the guide lever 30 is separated from the disc 1 or 2. The operating procedure and principle in this regard will be described in detail later. The locking unit 90 includes a locking lever 92, a ridge 69 and at least one position control recess 42.

The locking lever 92 is rotatably installed on the main chassis 10 and bent about 90°. In addition, a rotational axis 94 is provided at the bent part of the locking lever 92. Furthermore, the locking lever 92 is engaged with one end of an elastic member 99, of which the other end is mounted on the main chassis 10, so that the elastic member elastically biases a single directional rotation of the locking lever 92. More particularly, the elastic member 99 is installed on the lever part provided with the position control projection 98 with reference to the rotational axis 94 of the locking lever 92, thereby elastically biasing the locking lever 92 counterclockwise. That is, as the position control projection 98 of the locking lever 92 is elastically biased in the direction of causing the position control projection 98 to be engaged with the position control recess 42, the position control projection 98 extracted from the position control recess 42 can be easily engaged again with the position control recess 42 by the elastic force. The locking lever has the position control projection 98 and the locking projection at its opposite ends, respectively.

The position control projection 98 is provided at one end of the locking lever 92. The position control projection 98 is selectively engaged with the position control recess 42 formed in the disc guide lever 30, thereby preventing the disc guide lever 30 from being moved beyond the chucking position when it is pushed by a disc 1 or 2 as being transferred.

The locking projection 96 is provided at the other end of the locking lever 92. The locking projection 96 selectively comes into contact with the ridge 69 as the body 64 moves left and right, so that the locking lever 92 rotates about the rotational axis 94. By the rotation of the locking lever 92, the position control projection 98 provided at the one end of the locking lever 92 is extracted from the position control recess 42, thereby releasing the disc guide lever 30 from the locking state.

The ridge 69 is formed in a step shape at the left edge of the slide plate 60. Due to such a step shape, the slide plate 60 selectively pushes the locking projection 96 while being moved left and right.

As described above, the at least one position control recess 42 is a part, with which the position control projection 98 is selectively engaged. The at least one position control recess 42 is formed in the disc guide lever 30. The at least one position control recess 42 may comprise a first position control recess 42a and a second position control recess 42b. The first position control recess 42a is formed to control the position of the disc guide lever 30 at the time when the first disc 1 is introduced, whereas the second position control recess 42b is formed in the disc guide lever 30 at a position spaced from the first position control recess 42a by a predetermined distance to control the position of the disc guide lever 30 at the time when the second disc 2 is introduced. Like the cam slots 84, the number of the position control recesses 42a, 42b can be changed depending on the types of discs of different sizes capable of being used in a disc player. That is, a disc player which can play only one disc is provided with only one position control recess, and a disc player which can play three types of discs of different sizes is provided with three position control recesses.

By releasing a disc transferred to the chucking position from the disc guide lever 30 with a simple arrangement as described above, the present embodiment makes it possible to reduce the number of components of the disc release apparatus as compared to a conventional one and to miniaturize a disc player. In addition, because the number of elements linked with each other for releasing a disc, it is possible to reduce the power loss caused in the process of transmitting power for releasing the disc and to reduce the malfunction of the linked elements.

Reference numeral 40 indicates a moving slit formed in the disc guide lever, 40a and 40b indicate first and second slots formed at the opposite ends of the moving slit 40. In addition, reference numerals 51, 52 and 53 indicate a stopper boss, a rotational axis of the pushing lever 50 and a stopper projection, respectively, and reference numerals 55, 55a and 56 indicate a first door lever, a pushing projection formed on the first door lever, and a second door lever, respectively. Further, reference numeral 57 indicates a start switch for sensing the introduction of a disc so as to drive a transfer roller 59.

Now, description is made of a method and operation of releasing a disc from the disc guide lever.

At first, description is made in terms of a process of transferring the first disc 1, i.e., an 80 mm disc, to the chucking position.

Referring to FIG. 1 and FIG. 2, if the first disc 1 is inserted while swiveling the first door lever 55 and the second door lever 56, the start switch 57 senses it and the driving motor 58 is driven, thereby rotating the transfer roller 59. Then, the first disc 1 is transferred by the transfer roller 59 and comes into contact with and pushes the disc guide projections 34, 36 formed on the disc guide lever 30, thereby pushing the disc guide lever 30 in the direction indicated by arrow A. At this time, the first slot 40a pushes the stopper boss 51 formed on the pushing lever 50 in the A direction, so that the pushing lever 50 is rotated in the direction indicated by arrow B about the rotational axis 52 thereof and pushes the slider 20 in the direction indicated by arrow C. If so, the rack gear 24 is connected to the power transmission unit 54 connected with and driven by the driving motor, and the slider 20 continuously moves in the C direction. In addition, the disc guide lever 30 is moved until any of the position control recess 42 is engaged with the position control projection 98 formed on the locking lever 92. Through the process as described above, the first disc 1 is transferred to the chucking position as shown in FIG. 3.

Next, the process of releasing the first disc 1 is described.

Figure 3:
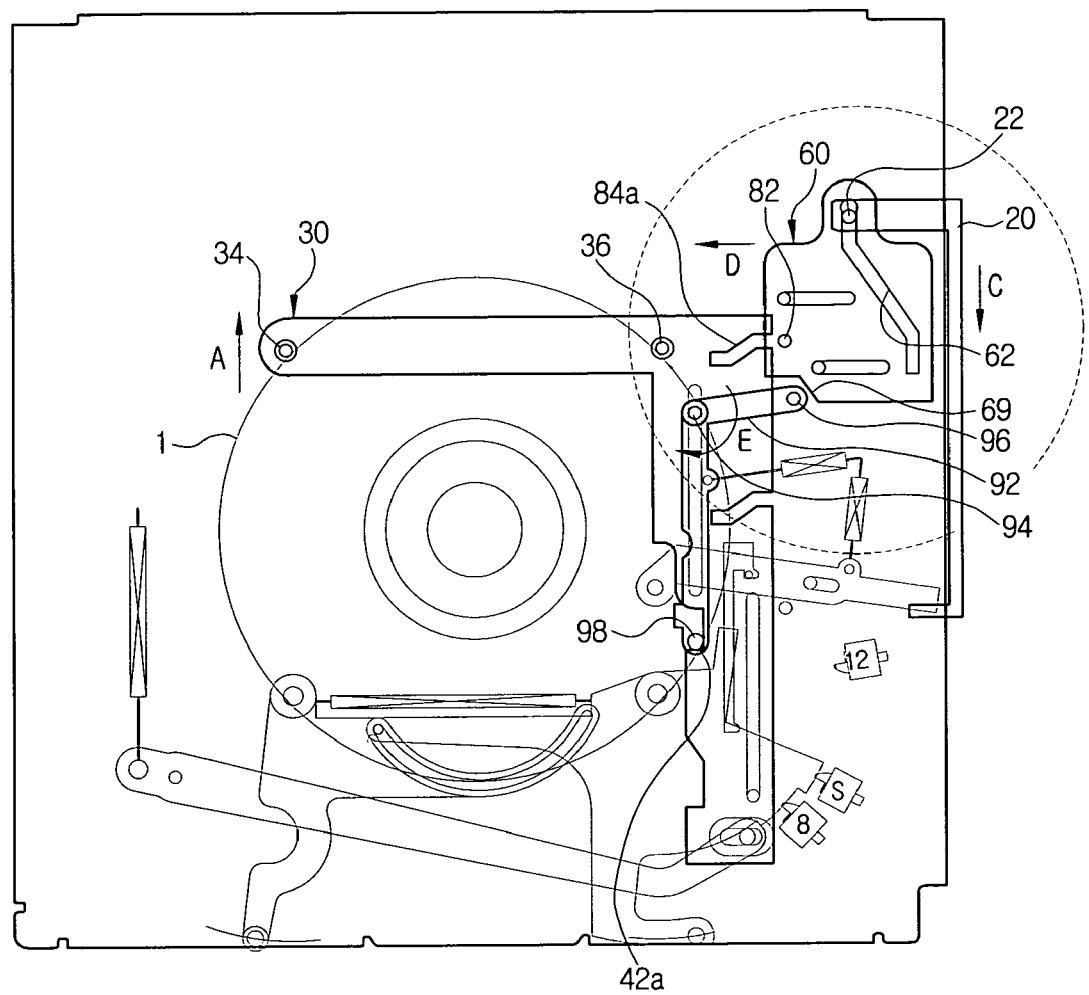
FIGS. 3 and 4 are top plan views for describing the release operation of a 80 mm disc.
Figure 4:
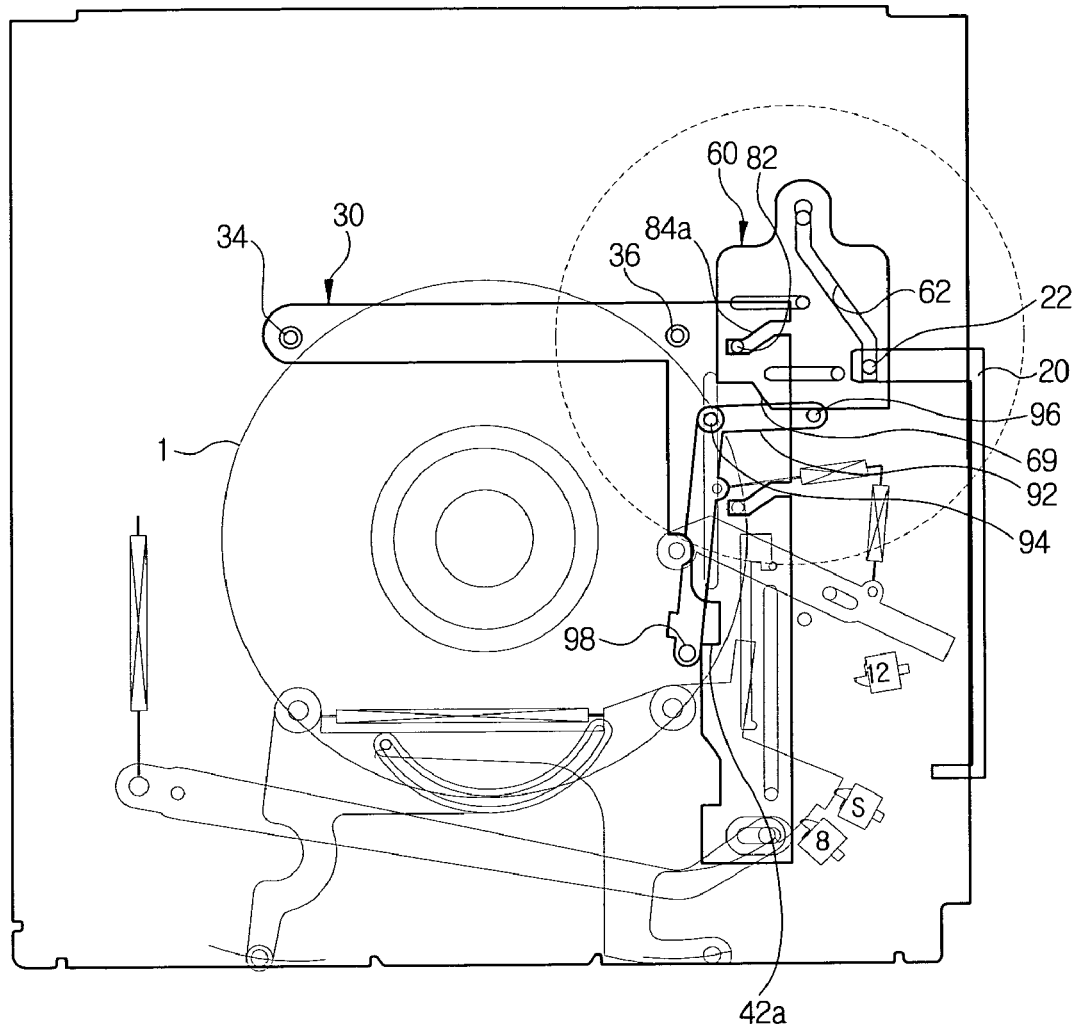

Referring to FIGS. 3 and 4, the slider 20 continuously moves in the C direction by the driving motor 58 (shown in FIG. 2). At this time, the sliding cam pin 22 pushes the slide plate 60 in the direction indicated by arrow D while moving along the sliding cam slot 62 formed in the slide plate 60.

If the slide plate 60 is pushed and moved in the D direction, the locking projection 96 formed on one end of the locking lever 92 moves along the ridge 69 formed in a step shape at the outline of the slide plate 60. Then, the ridge 69 pushes the locking projection 96, and if the locking projection 96 is pushed, the locking lever 92 is rotated about the rotational axis 94 thereof in the direction indicated by arrow E. If the locking lever 92 rotates in the E direction, the position control projection 98 provided at the one end of the locking lever 92 is extracted from the first position control recess 42a, as a result of which the disc guide lever 30 is released from the locking state. That is, the disc guide lever 30 is positioned in the state of being movable back and forth.

After the guide lever 30 is released from the locking state, the slide plate 60 continues to move to the D direction, and the cam pin 82 provided on the slide plate 60 is inserted into the first cam slot 84a formed in the disc guide lever 30 as the slide plate 60 moves in the D direction. The cam pin 82 inserted into the first cam slot 84a pushes the first cam slot 84a in the A direction while moving in the D direction. By this, the disc guide lever 30 is moved in the A direction. If the disc guide lever 30 is moved in the A direction, the disc guide projections 34, 36 formed on the disc guide lever 35, which have guided the first disc 1, are separated from the first disc 1. Through this process, the first disc 1 is positioned in the state of being rotatable as shown in FIG. 4.

In addition, if a signal for discharging the first disc 1 from the main chassis 10 is inputted, the driving motor 58 is rotated in the direction reverse to the rotational direction at the time of loading the disc 1. The subsequent process is progressed in reverse to the process described above.

Next, description is made of processes of transferring and separating the second disc, i.e., a 120 mm disc.

Referring to FIGS. 1 and 2, the process of transferring the second disc 2 to the chucking position is described. As the second disc 2 rotates the first door lever 55 to a greater distance because the second disc 2 is larger than the first disc 1, the pushing projection 55a formed on the first door lever 55 pushes the position control projection 98 of the locking lever 92 and the pushed locking lever 92 pushes the stopper projection 53 formed on the one end of the pushing lever 50 in the direction indicated by arrow F. Then, the stopper boss 51 formed on the pushing lever 50 is moved to the left side from the first slot 40a, so that the disc guide lever 30 is allowed to move in the A direction, and the second disc 2 is continuously moved by the transfer roller 59, thereby coming into contact with the disc guide projections 34, 36 and pushes the guide lever 30 in the A direction. At this time, the stopper boss 51 provided on the pushing lever 50 moves along the moving slit 40 and arrives at the second slot 40b. If the stopper boss 51 arrives at the second slot 40b, the second slot 40b pushes and rotates the stopper boss 51 in the B direction about the rotational axis 52 thereof, and the other end of the pushing lever 50 pushes the slider 20 is the C direction while the pushing lever 50 is being rotated, thereby connecting the slider to the driving motor 59. Then, the disc guide lever 30 continuously moving to the A direction stops the movement as the second position control recess 42b is caught on the position control projection 98. Through the process as mentioned above, the second disc 2 is transferred to the chucking position as shown in FIG. 5.

Next, the disc release process of the second disc 2 is described.

Figure 5:
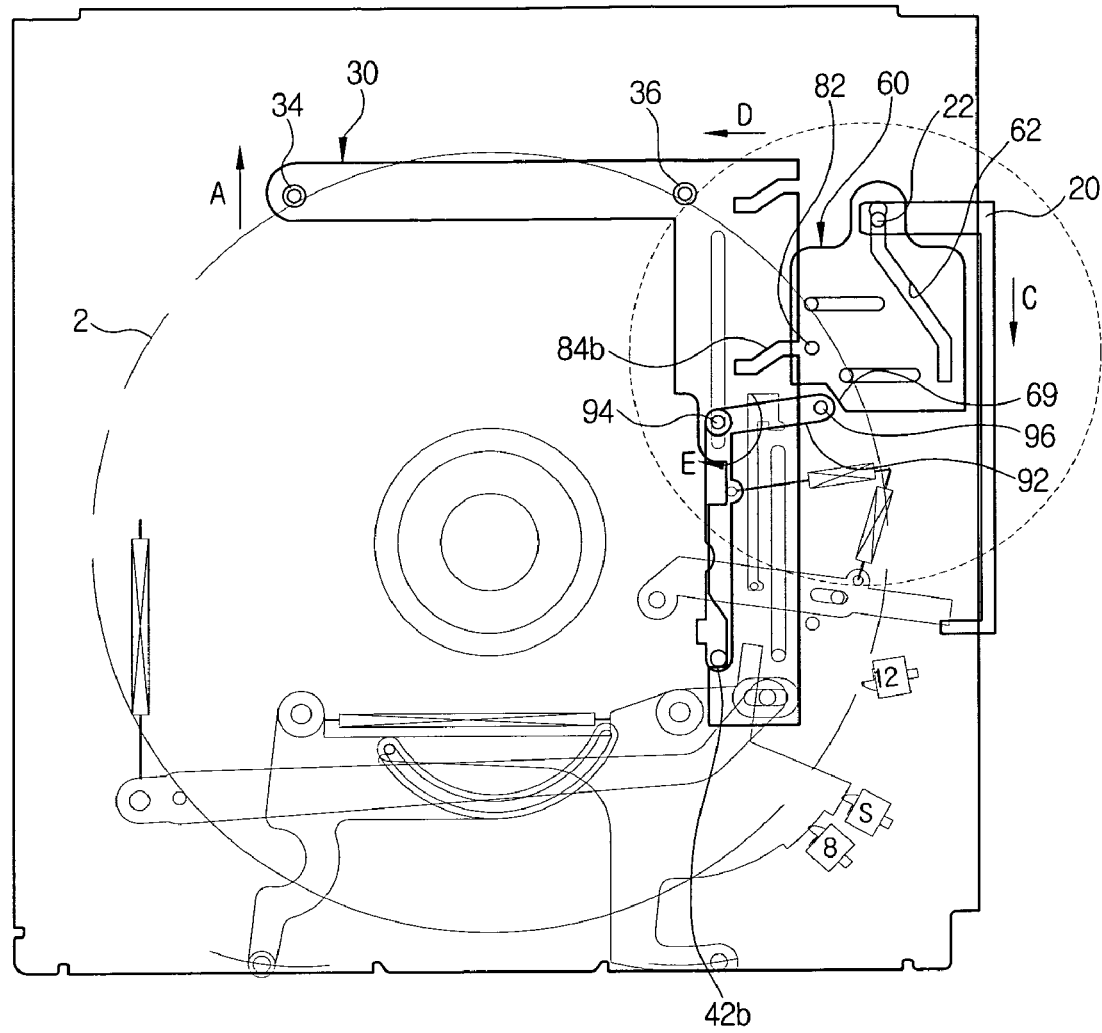
FIGS. 5 and 6 are top plan views for describing the release operation of a 120 mm disc according to an embodiment of the present invention.
Figure 6:
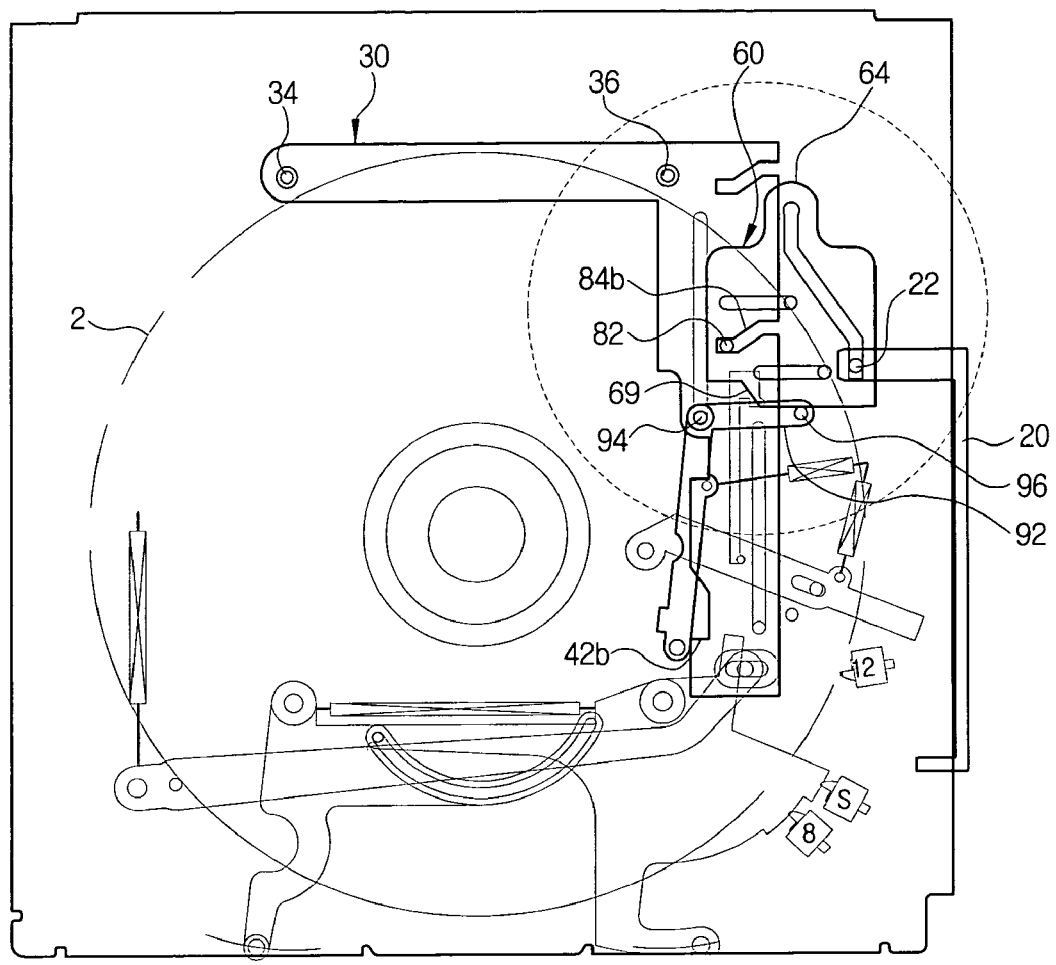

Referring to FIGS. 5 and 6, while being operated as described above, the slider 20 is continuously moved in the C direction by the driving motor 58 (shown in FIG. 2). At this time, the sliding camp pin 22 pushes the slide plate 60 in the D direction while being moved along the sliding cam slot 62. By this, the plate 60 is moved in the D direction.

When the slide plate 60 is pushed and moved in the D direction, the locking projection provided at the one end of the locking lever 92 is moved along the step-shaped ridge 69. Then, if the ridge 69 pushes the locking projection 96, the locking lever 92 is rotated in the E direction. If the locking lever 92 is rotated, the position control projection 98 provided at the other end of the locking lever 92 is extracted from the second position control recess 42b, whereby the disc guide lever 30 is released from the locking state. That is, the disc guide lever 30 is positioned in the state of being movable back and forth.

After the disc guide lever 30 is released from the locking state, the slide plate 60 continuously moves in the D direction, and as the slide plate 60 moves in the D direction, the cam pin 82 provided on the slide plate 60 is inserted into the second cam slot 84b. The cam pin 82 inserted into the second cam slot 84b pushes the second cam slot 84b in the A direction while moving in the D direction. By this, the disc guide lever 30 is moved in the A direction. If the disc guide lever 30 is moved in the A direction, the disc guide projections 34, 36 formed on the disc guide lever 30, which have guided the second disc 2 as being transferred, are separated from the second disc 2. Through this process, the second disc 2 is placed in the state of being rotatable as shown in FIG. 6.

Furthermore, if a signal for discharging the second disc 2 from the main chassis 10 is inputted, the driving motor 58 rotates in the direction reverse to its rotating direction at the time of loading the disc 2. Then, the slider is moved in the direction opposite to the C direction. Thereafter, the operation is progressed in the reversed sequence.

According to the above-described embodiments of the present invention, the disc release apparatus for a disc player has a simplified construction for separating the disc guide lever from a disc transferred to the chucking position, whereby the number of components thereof can be reduced. Accordingly, the space within a disc player can be saved and thus it is possible to miniaturize and slim the disc player.

In addition, because the number of linked elements is reduced, it is possible to reduce the power loss caused in the process of transmitting power for releasing the disc as well as the malfunction of the linked elements.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A disc release apparatus for a disc player including a slider sliding on a main chassis of the disc player to be contacted with or separated from a disc as the disc is loaded or unloaded, comprising:

a disc guide lever on the main chassis, linearly movable, linked with the slider, and guiding transfer of discs to a chucking position within the main chassis;

a slide plate installed on the main chassis and linked with the slider, the slide plate including, a flat sheet-like body movably installed at a side of the main chassis, having two guide slots engaging two guide pins on the main chassis so that the guide slots move along the guide pins restricting movement of the slide plate, and a sliding cam slot having a crank shape, receiving a sliding cam pin on the slider, and moving with the sliding cam pin; and a linkage unit on the main chassis and linked with the slide plate to move the disc in the transfer direction.

2. A disc release apparatus as claimed in claim 1, wherein the slide plate includes a guide slot so that the moving direction of the slide plate is controllable by a guide pin on the main chassis.

3. A disc release apparatus as claimed in claim 1, wherein the linkage unit includes:

a cam pin on the slide plate; and at least one cam slot formed in the disc guide lever, so that the at least one slot is linked with the cam pin to move the disc guide lever in the disc transfer direction.

4. A disc release apparatus as claimed in claim 3, wherein the at least one cam slot includes a first cam slot and a second cam slot, the cam pin being selectively inserted into one of the cam slots depending on the size of the disc as being loaded.

5. A disc release apparatus as claimed in claim 1, further comprising a locking unit linked with the slide plate so as to lock or unlock the disc guide lever.

6. A disc release apparatus as claimed in claim 5, wherein the locking unit includes:

a ridge formed in the slide plate;

at least one position control recess in the disc guide lever; and a locking lever rotatably installed on the main chassis and having a locking projection at one end thereof, wherein the locking projection comes into contact with the ridge, and a position control projection at an end opposite the one end, and wherein the position control projection is selectively engaged with the at least one position control recess.

7. A disc release apparatus as claimed in claim 6, wherein the disc guide lever includes a first cam slot and a second cam slot, the cam pin being selectively inserted into one of the cam slots depending on the size of the disc as being loaded.

8. A disc release apparatus as claimed in claim 6, wherein the locking lever is elastically biased in a single direction by an elastic member.

9. A disc release apparatus, comprising:

a disc guide lever on a main chassis, linearly movable, and guiding transfer of discs to a chucking position within the main chassis;

a slider mounted on a side of the main chassis and reciprocating in a disc transfer direction;

a slide plate movably installed on the main chassis and linked with the slider, the slide plate including;
- a flat sheet-like body movably installed at a side of the main chassis, having two guide slots engaging two guide pins on the main chassis so that the guide slots move along the guide pins restricting movement of the slide plate, and
- a sliding cam slot having a crank shape, receiving a sliding cam pin on the slider, and moving with the sliding cam pin: and a linkage installed on the main chassis and linked with the slide plate so as to move the disc guide lever in the disc transfer direction or in a reverse direction.

10. The disk release apparatus of claim 9, wherein the slider includes a rack gear selectively connected by a pushing lever to a power transmission unit connected to a driving motor.

11. The disk release apparatus of claim 9, further comprising a locking unit on the main chassis and moved in association with the slide plate to selectively lock the disc guide lever.

12. A disc drive, comprising:
- a disc guide lever on a main chassis, linearly movable, and guiding transfer of discs to a chucking position within the main chassis;
- a slider mounted on a side of the main chassis and reciprocating in a disc transfer direction;
- a slide plate movably installed on the main chassis and linked with the slider, the slide plate including,
  - a flat sheet-like body movably installed at a side of the main chassis, having two guide slots engaging two guide pins on the main chassis so that the guide slots move along the guide pins restricting movement of the slide plate, and
  - a sliding cam slot having a crank shape, receiving a sliding cam pin on the slider, and moving with the sliding cam pin; and
- a linkage installed on the main chassis and linked with the slide plate so as to move the disc guide lever in the disc transfer direction or in a reverse direction.

* * * * *

UNITED STATES PATENT AND TRADEMARK OFFICE
CERTIFICATE OF CORRECTION

| | |
|---|---|
| PATENT NO. | : 7,428,739 B2 |
| APPLICATION NO. | : 11/177315 |
| DATED | : September 23, 2008 |
| INVENTOR(S) | : Hwan-seung Lee |

It is certified that error appears in the above-identified patent and that said Letters Patent is hereby corrected as shown below:

Column 9, Line 2, change "including;" to --including,--.

Column 9, Line 10, change "pin:" to --pin;--.

Signed and Sealed this

Sixteenth Day of December, 2008

JON W. DUDAS
*Director of the United States Patent and Trademark Office*